(12) United States Patent
Li et al.

(10) Patent No.: US 10,305,627 B2
(45) Date of Patent: May 28, 2019

(54) ADAPTIVE UPLINK LINK ADAPTATION

(71) Applicant: Apple Inc., Cupertino, CA (US)

(72) Inventors: Si Li, San Jose, CA (US); Zhu Ji, San Jose, CA (US); Srinivasan Vasudevan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 550 days.

(21) Appl. No.: 14/503,217

(22) Filed: Sep. 30, 2014

(65) Prior Publication Data

US 2015/0263830 A1    Sep. 17, 2015

Related U.S. Application Data

(60) Provisional application No. 61/950,947, filed on Mar. 11, 2014.

(51) Int. Cl.
*H04L 1/00* (2006.01)

(52) U.S. Cl.
CPC .......... *H04L 1/0015* (2013.01); *H04L 1/0003* (2013.01); *H04L 2001/0098* (2013.01)

(58) Field of Classification Search
None
See application file for complete search history.

(56) References Cited

U.S. PATENT DOCUMENTS

| | | | | |
|---|---|---|---|---|
| 6,154,450 | A | * | 11/2000 | Wallentin ............... H04W 52/04 370/311 |
| 9,319,928 | B2 | * | 4/2016 | Bertrand ................ H04L 1/0009 |
| 2009/0069042 | A1 | * | 3/2009 | Wang .................... H04W 52/12 455/522 |
| 2009/0185530 | A1 | * | 7/2009 | Sternberg .................. H04L 1/20 370/329 |
| 2013/0042157 | A1 | * | 2/2013 | Mohammadi ......... H04L 1/0026 714/704 |
| 2014/0126467 | A1 | * | 5/2014 | Lu ........................... H04L 1/003 370/328 |
| 2016/0323899 | A1 | * | 11/2016 | Arvidson ............... H04B 7/024 |

* cited by examiner

*Primary Examiner* — Peter P Chau
*Assistant Examiner* — Mariela Vidal Carpio
(74) *Attorney, Agent, or Firm* — Meyertons, Hood, Kivlin, Kowert & Goetzel, P.C.

(57) ABSTRACT

A wireless communication system is presented for adaptive uplink (UL) link adaptation (LA). The adaptive UL LA can include multiple outer loops, for which multiple block error rate (BLER) filtering is performed. Each of the multiple BLER filtering can be performed on groups or sub-groups of subframes, in which each group has the same or similar coding characteristics. For example, one group in TD-LTE could be subframes with sounding reference signal (SRS) and another group could be subframes without SRS. Each of the multiple BLER filtering can use the same or different BLER algorithm, BLER target and/or BLER parameters.

8 Claims, 9 Drawing Sheets

TDD sounding reference signal subframe configuration

| Configuration | Binary | Configuration Period (sub-frames) | Transmission offset (sub-frames) |
|---|---|---|---|
| 0 | 0000 | 5 | {1} |
| 1 | 0001 | 5 | {1,2} |
| 2 | 0010 | 5 | {1,3} |
| 3 | 0011 | 5 | {1,4} |
| 4 | 0100 | 5 | {1,2,3} |
| 5 | 0101 | 5 | {1,2,4} |
| 6 | 0110 | 5 | {1,3,4} |
| 7 | 0111 | 5 | {1,2,3,4} |
| 8 | 1000 | 10 | {1,2,6} |
| 9 | 1001 | 10 | {1,3,6} |
| 10 | 1010 | 10 | {1,6,7} |
| 11 | 1011 | 10 | {1,2,6,8} |
| 12 | 1100 | 10 | {1,3,6,9} |
| 13 | 1101 | 10 | {1,4,6,7} |
| 14 | 1110 | Inf | N/A |
| 15 | 1111 | reserved | reserved |

Figure 7

ADAPTIVE UPLINK LINK ADAPTATION

PRIORITY CLAIM

This application claims the benefit of priority from U.S. Provisional Patent Application Ser. No. 61/950,947, entitled "Adaptive Uplink Link Adaptation" and filed Mar. 11, 2014, which is fully incorporated herein by reference for all purposes to the extent not inconsistent with this application.

BACKGROUND

Field of the Application

This disclosure is directed to wireless communications and, more particularly, to adaptive uplink (UL) link adaptation in wireless communications.

Background of the Disclosure

Wireless communication systems are widely deployed to provide various communication services, such as: voice, video, packet data, circuit-switched info, broadcast, messaging services, and so on. A typical wireless communication system, or network, can provide multiple users access to one or more shared resources (e.g., bandwidth, transmit power, etc.). These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems and Orthogonal Frequency Division Multiple Access (OFDMA) systems.

Generally, a wireless multiple-access communication system can simultaneously support communication for multiple wireless devices or terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), single-in-multiple-out (SIMO), multiple-in-signal-out (MISO), or a multiple-in-multiple-out (MIMO) system.

For instance, a MIMO system can employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_S$ independent channels can correspond to a dimension. The MIMO system can provide improved performance (e.g., higher throughput and/or greater reliability) if the additional dimensionalities created by the multiple transmit and receive antennas are utilized.

A MIMO system can support a time division duplex (TDD) and frequency division duplex (FDD) systems. In an FDD system, the transmitting and receiving channels are separated with a guard band (some amount of spectrum that acts as a buffer or insulator), which allows two-way data transmission by, in effect, opening two distinct radio links. In a TDD system, only one channel is used for transmitting and receiving, separating them by different time slots. No guard band is used. This can increase spectral efficiency by eliminating the buffer band and can also increase flexibility in asynchronous applications. For example, if less traffic travels in the uplink, the time slice for that direction can be reduced, and reallocated to downlink traffic.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Uplink (UL) scheduling algorithms can be quite different depending on the implementation choices of the various manufacturers and operators of the base station equipment and the mobile device equipment. In general UL modulation coding schemes (MCSs), resource blocks (RBs) and transmitted power, among other parameters, can be adaptively determined by a mobile device to achieve good, better or best performance under a given block error rate (BLER) target.

Link adaptation (LA) or adaptive modulation and coding (AMC), is a term used in wireless communications to denote the matching of the modulation, coding and other signal and protocol parameters to the conditions on the radio link (e.g., the path loss, the interference due to signals coming from other transmitters, the sensitivity of the receiver, the available transmitter power margin, and so on). The process of link adaptation can be a dynamic one and the signal and protocol parameters can change as the radio link conditions change.

Therefore, what is needed are techniques to facilitate mobile device performance of adaptive uplink link adaptation in wireless communications.

BRIEF DESCRIPTION OF THE DRAWINGS

FIG. 7 illustrates exemplary TDD sounding reference signal subframe configurations according to and/or used with certain embodiments;

DETAILED DESCRIPTION

The following detailed description is directed to certain sample embodiments. However, the disclosure can be embodied in a multitude of different ways as defined and covered by the claims. In this description, reference is made to the drawings wherein like parts are designated with like numerals within this application.

This disclosure makes reference to various wireless communication devices, such as access point, mobile device, base station, user equipment, Node B, access terminal and eNB. The use of these and other names is not intended to indicate or mandate one particular device, one particular standard or protocol, or one particular signaling direction and is expressly intended to not be limiting of the scope of this application in any way. The use of these and other names is strictly for convenience and such names may be interchanged within this application without any loss of coverage or rights.

Various techniques described herein can be used for various wireless communication systems, such as Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, CDMA2000, IS-856, W-CDMA, TDSCDMA, and other standards. A CDMA network may implement a radio technology such as Universal Terrestrial Radio Access ("UTRA)", CDMA2000, or some other technology. UTRA includes W-CDMA and Low Chip Rate ("LCR"). The CDMA2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11 ("WiFi"), IEEE 802.16 "(Wi-MAX"), IEEE 802.20 ("MBWA"), Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17) technology, as well as 3GPP2 (lxRTT, 1xEV-DO RelO, RevA, RevB) technology and other technologies, such as WiFi, WiMAX, WMBA and the like.

Figure 1:
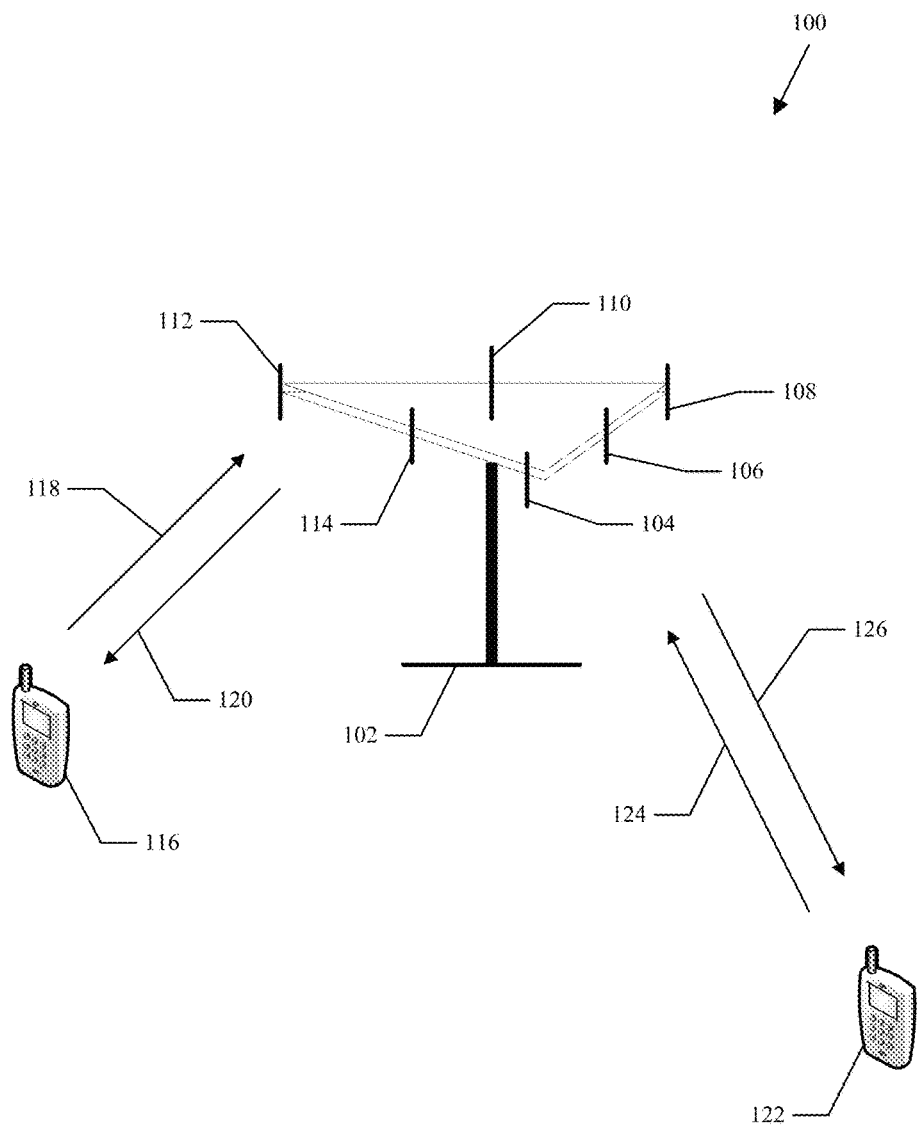
FIG. 1 illustrates an exemplary wireless multiple-access communication system according to certain embodiments.

Referring now to the drawings, FIG. 1 illustrates an exemplary wireless multiple-access communication system 100 according to certain embodiments. In one example, an enhanced Node B (eNB) base station 102 includes multiple antenna groups. As shown in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. As shown, user equipment (UE) 116 can be in communication with antennas 112 and 114, where antennas 112 and 114 transmit information to UE 116 over downlink (or forward link) 120 and receive information from UE 116 over uplink (or reverse link) 118. Additionally and/or alternatively, UE 122 can be in communication with antennas 104 and 106, where antennas 104 and 106 transmit information to UE 122 over downlink 126 and receive information from US 122 over uplink 124. In a frequency division duplex (FDD) system, communication links 118, 120, 124 and 126 can use different frequencies for communication. In time division duplex (TDD) systems, the communication links can use the same frequency for communication, but at differing times.

Each group of antennas and/or the area in which they are designed to communicate can be referred to as a sector of the eNB or base station. In accordance with one aspect, antenna groups can be designed to communicate to mobile devices in a sector of areas covered by eNB 102. In communication over downlinks 120 and 126, the transmitting antennas of eNB 102 can utilize beamforming in order to improve the signal-to-noise ratio of downlinks for the different UEs 116 and 122. Also, a base station using beamforming to transmit to UEs scattered randomly through its coverage causes less interference to mobile devices in neighboring cells than a base station transmitting through a single antenna to all its UEs. In addition to beamforming, the antenna groups can use other multi-antenna or antenna diversity techniques, such as spatial multiplexing, spatial diversity, pattern diversity, polarization diversity, transmit/receive diversity, adaptive arrays, and the like.

Figure 2:
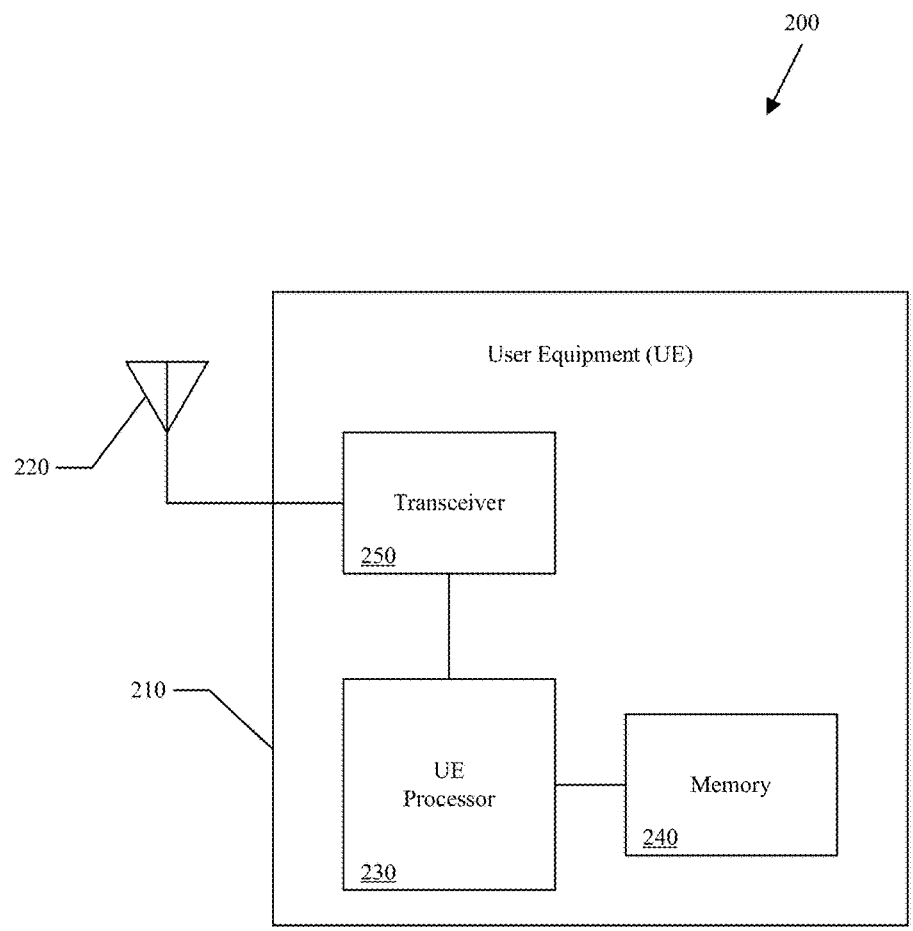
FIG. 2 illustrates a block diagram of an exemplary mobile device or user equipment (UE) according to certain embodiments.

FIG. 2 illustrates a block diagram 200 of an exemplary mobile device or user equipment (UE) 210 according to certain embodiments. As shown in FIG. 2, UE 210 may include a transceiver 250, an antenna 220, a processor 230, and a memory 240 (which, in certain embodiments, may include memory in a Subscriber Identity Module (SIM) card). In certain embodiments, some or all of the functionalities described herein as being performed by mobile communication devices may be provided by processor 230 executing instructions stored on a computer-readable medium, such as the memory 240, as shown in FIG. 2. Additionally, UE 210 may perform uplink and/or downlink communication functions, as further disclosed herein, via transceiver 250 and antenna 220. While only one antenna is shown for UE 210, certain embodiments are equally applicable to multi-antenna mobile devices. In certain embodiments, UE 210 may include additional components beyond those shown in FIG. 2 that may be responsible for enabling or performing the functions of UE 210, such as communicating with a base station in a network and for processing information for transmitting or from reception, including any of the functionality described herein. Such additional components are not shown in FIG. 2 but are intended to be within the scope of coverage of this application.

Figure 3:
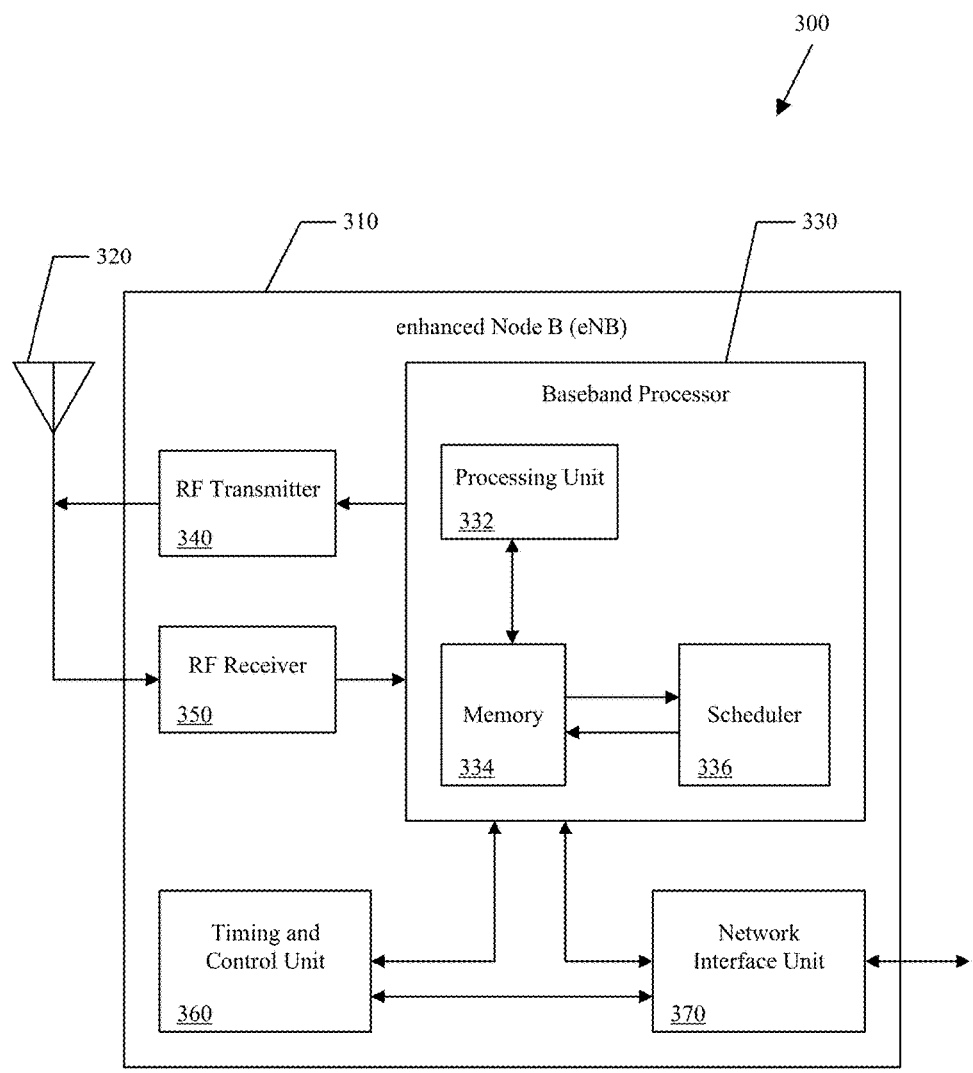
FIG. 3 illustrates a block diagram of an exemplary enhanced Node B (eNB) or similar mobile communication node (e.g., base station, access point, etc.) according to certain embodiments.

FIG. 3 illustrates a block diagram 300 of an exemplary enhanced Node B (eNB) 310 or similar mobile communication node (e.g., base station, access point, etc.) according to certain embodiments. As shown in FIG. 3, eNB 310 may include a baseband processor 310 to provide radio communication with mobile handsets via a radio frequency (RF) transmitter 340 and RF receiver 330 units coupled to the eNB antenna 320. While only one antenna is shown, certain embodiments are applicable to multi-antenna configurations. RF transmitter 340 and RF receiver 330 may be combined into one, transceiver unit, or duplicated to facilitate multiple antenna connections. Baseband processor 320 may be configured (in hardware and/or software) to function according to a wireless communications standard, such as 3GPP LTE. Baseband processor 320 may include a processing unit 332 in communication with a memory 334 to process and store relevant information for the eNB and a scheduler 336, which may provide scheduling decisions for mobile devices serviced by eNB 310. Scheduler 336 may have some or all of the same data structure as a typical scheduler in an eNB in an LTE system.

Baseband processor 330 may also provide additional baseband signal processing (e.g., mobile device registration, channel signal information transmission, radio resource management, etc.) as required. Processing unit 332 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described herein as being provided by a mobile base station, a base station controller, a node B, an enhanced node B, an access point, a home base station, a femtocell base station, and/or any other type of mobile communications node may be provided by processing unit 332 executing instructions stored on a computer-readable data storage medium, such as the memory 334 shown in FIG. 3.

In certain embodiments, eNB 310 may further include a timing and control unit 360 and a core network interface unit 370, such as are shown in FIG. 3. Timing and control unit 360 may monitor operations of baseband processor 330 and network interface unit 370, and may provide appropriate timing and control signals to these units. Network interface unit 370 may provide a bi-directional interface for eNB 310 to communicate with a core or back-end network (not shown) to facilitate administrative and call-management functions for mobile subscribers operating in the network through eNB 310.

Certain embodiments of the base station 310 may include additional components responsible for providing additional functionality, including any of the functionality identified herein and/or any functionality necessary to support the solution described herein. Although features and elements are described in particular combinations, each feature or element can be used alone without the other features and elements or in various combinations with or without one or more features and elements. Methodologies provided herein may be implemented in a computer program, software, or firmware incorporated in a computer-readable storage medium (e.g., memory 334 in FIG. 3) for execution by a general purpose computer or a processor (e. g., processing unit 332 in FIG. 3). Examples of computer-readable storage media include read only memory (ROM), random access memory (RAM), digital registers, cache memory, semiconductor memory devices, magnetic media such as internal hard disks, magnetic tapes and removable disks, magneto-optical media, and optical media such as CDROM disks, digital versatile disks (DVDs), and so on.

Figure 4:
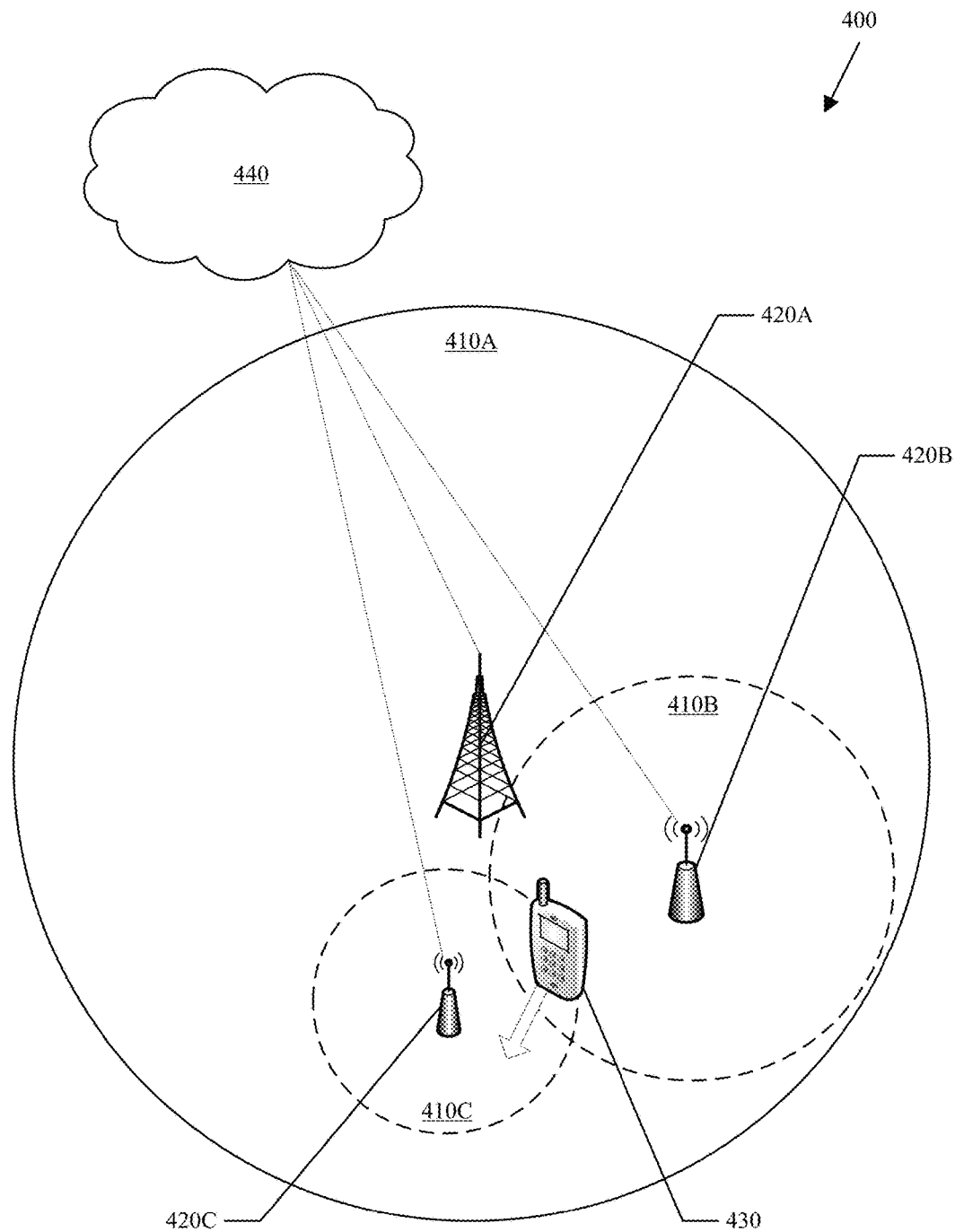
FIG. 4 illustrates an exemplary multi-RAT wireless network according to certain embodiments.

FIG. 4 illustrates an exemplary multi-RAT (radio access technology) wireless network 400 according to certain embodiments. As shown in FIG. 4, a mobile device (handset, UE, etc.) 430 is within the coverage area of multi-RAT wireless network 400. Multi-RAT wireless network 400 can include multiple network coverage pieces. For example, the once coverage area can be a cell 410A, such as in an LTE coverage area. Within (or partially within) cell 410A coverage area, there can concurrently exist one or more other coverage areas, or cells 410B and 410C, such as in a GSM, WiMAX, CDMA or even WiFi coverage area. As shown, cells 410B, 410C are within cell 410A and at least partially overlap each other, although this configuration is for illustrative purposes only. Each cell 410 can also include some sort of network access device 420A, 420B and 420C, such as a base station, eNodeB or access point. Each network access device 420 can communicate with one or more mobile devices 430, as well as with a core network 440. Not shown are possible intermediate network components or system elements that may be between each network access device 420 and core network 440. In certain embodiments, mobile device 430 can be moving within cell 410A and moving out of cell 410B and into cell 410C. In this way, mobile device 430 could possibly communicate with one or more of cells 410A, 410B and 410C.

In certain embodiments, the disclosure herein focuses on time division long term evolution (TD-LTE) systems. Without loss of generality, this application can be applied to FD-LTE systems or other non-LTE systems, where the physical data channels experience different code rates or channel estimation accuracies over time. Likewise, this disclosure is intended to be equally applicable to both uplink and downlink communications.

Uplink (UL) scheduling algorithms can be quite different depending on the implementation choices of the various manufacturers and operators of the equipment. In general UL modulation coding schemes (MCSs), resource blocks (RBs) and transmitted power, among other parameters, can be adaptively determined by UE to achieve good, better or best performance under a given BLER target.

Figure 5:
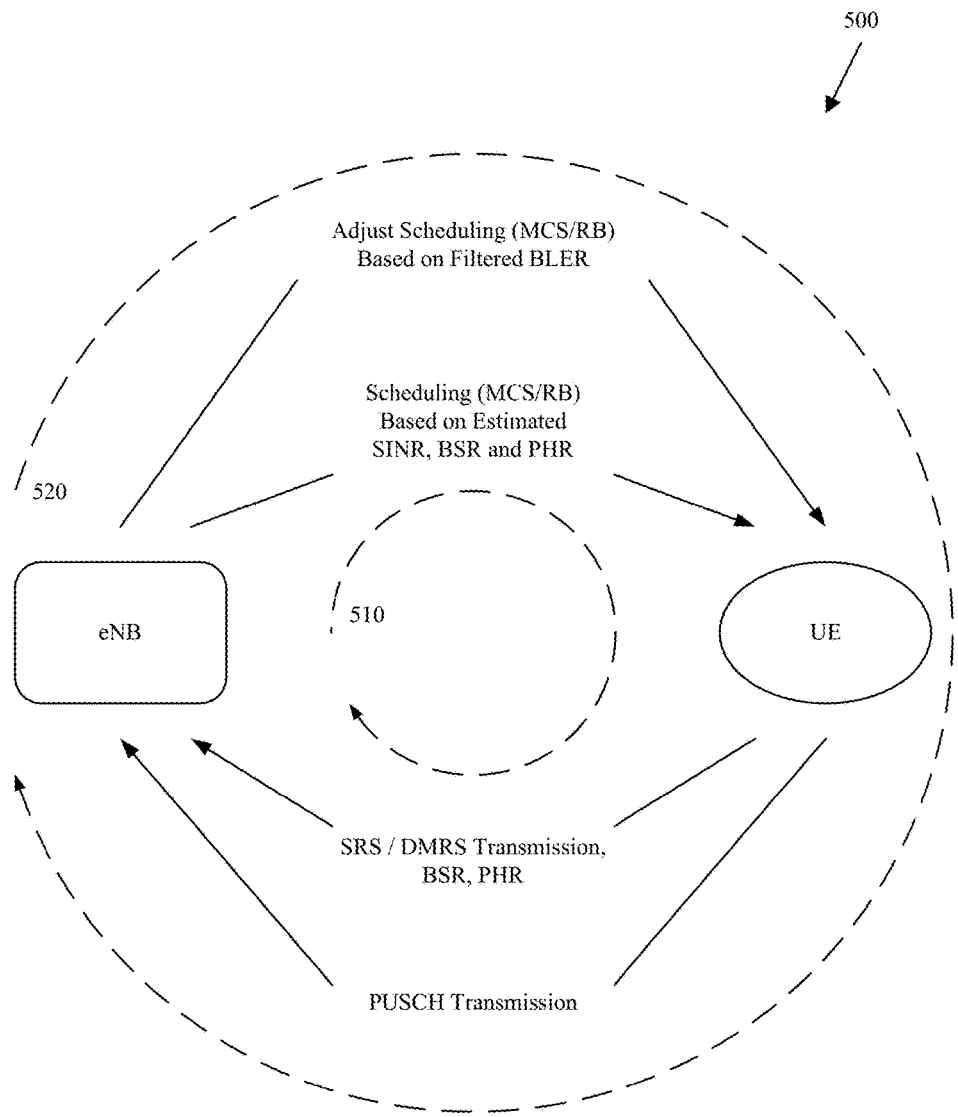
FIG. 5 illustrates exemplary link adaptation inner loop and outer loop representations according to and/or used with certain embodiments.

FIG. 5 illustrates exemplary link adaptation inner loop and outer loop representations 500 that can be used with certain embodiments. As shown in FIG. 5, link adaptation can be characterized as having two loops: an inner loop 510 and an outer loop 520. For inner loop 510, the eNB can choose a modulation and coding scheme (MCS) and resource blocks (RBs) based at least on the signal plus interference to noise ratio (SINR) derived from reference symbols, buffer static report (BSR), power headroom report (PHR) and sometimes the block error rate (BLER) target (e.g., 10%, etc.) at the first transmission. The eNB can use other channel condition, signal, device and/or protocol parameters as well.

For outer loop 520, generally speaking, there can be a BLER target to be maintained by the eNB, which can vary for different channel scenarios (e.g., Doppler dependent, etc.). Due to various measurement inaccuracies, like the difference between SINR estimated from demodulation reference signal (DMRS) or sounding reference signal (SRS) and experienced SINR on the data channel, the time delay between SINR estimation/link adaptation and the real data transmission, the eNB can apply outer loop 520, which can dynamically adjust the MCS/RB based on the actually-measured BLER and/or the BLER target. The BLER filtering can be implemented in different fashions, such as, for example, infinite impulse response (IIR) filtering the cyclic redundancy check (CRC) errors and/or block-wise moving average across all subframes. The choice of how to average and what BLER target to use can be implementation dependent. Hysteresis can be applied to the BLER targets when the average BLER changes large enough to trigger the MCS adjustment. For example, in LTE, the MCS (which determines the code rate, the higher the MCS, the higher the code rate) can be adjusted based on the filtered BLER fluctuation. Also, the step size of MCS adjustment can be dynamically selected and/or adjusted. For example, to aid with stability of the outer loop, adjusting the step size up for MCS can be smaller as compared adjusting the step size down for MCS. Note, however, that if the outer-loop filters the BLER from all UL data subframes, it could cause a very high overall BLER when certain UL subframes have a much higher coding rate.

A sounding reference signal (SRS) is the reference signal sent out by a UE. The primary use of SRS is for the eNB to estimate the channel quality of the uplink path for each subsection of a frequency region. A demodulation reference signal (DMRS) is transmitted together with the PUSCH or PUCCH, in the same RBs, so the channel quality information the eNB extracts from the UL DM-RS is specific to that transmission (i.e., those specific RBs only with the PUSCH or PUCCH). However, SRS can be transmitted at one time or periodically, and with configurable bandwidth (i.e., beyond PUSCH/PUCCH RBs allocated for UL data transmission) and even when there are no UL data for transmission. In this way, the SRS can be considered as a wideband UL pilot signal, which can be used by the eNB to probe the channel better than, e.g., with DM-RS.

There are numerous SRS-related parameters, which can be provided through a system information block (SIB), such as SIB2, and/or radio resource control (RRC) signaling. Specifically, two sets of SRS-related parameters are discussed below: one set is cell specific (i.e., applies to all UEs within the cell), and one set is UE specific. These parameters can be better defined by referencing the LTE standard specification 36.211 and/or 36.213, which are incorporated herein by reference (with specific paragraph or sub-section numbers noted parenthetically, below, after each parameter).

The cell specific parameters can include: srs-BandWidthConfig (section 5.5.3) and srs-SubframeConfig (section 5.3.3). srs-BandWidthConfig is the maximum bandwidth for the SRS and is a 3 bit parameter, together with the UE specific parameter srs-Bandwidth (2 bits), number of resource block (frequency bandwidth) allocated for SRS transmission for a specific UE can be determined. srs-SubframeConfig defines on which subframes the SRS can be transmitted and is a 4 bit parameter indicating the sets of subframes where the SRS can be transmitted within each radio frame for any UE in this cell.

The UE specific parameters can include: srs-Bandwidth (section 5.5.3), srs-Configindex (36.213), freqDomainPosition (section 5.3.3), srs-HoppingBandwidth (section 5.3.3), transmissionComb and cyclic shift. srs-Bandwidth provides the SRS transmission bandwidth for a UE and is 2 bits. srs-Configindex defines UE specific periodicity and subframe offset. freqDomainPosition provides UE specific frequency domain position. srs-HoppingBandwidth defines frequency hop size. transmissionComb provides the transmission comb offset. Cyclic shift, for which up to 8 cyclic time shifts per SRS comb are supported.

SRS Configuration Impact on Code Rate

Figure 6:
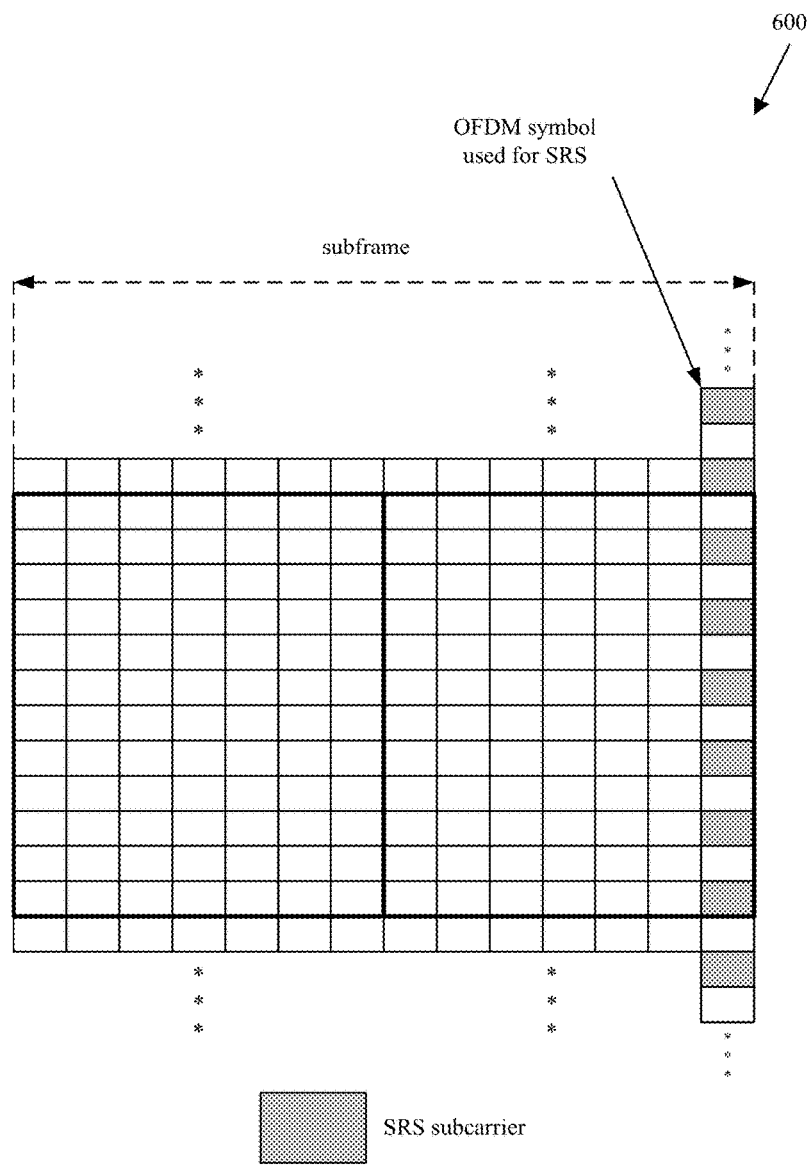
FIG. 6 illustrates an exemplary SRS-configured subframe according to and/or used with certain embodiments.

FIG. 6 illustrates an exemplary SRS-configured subframe 600 according to certain embodiments. Depending on the SRS configuration, code rate for each UL subframe can be quite different. Code rate will be higher if this subframe is configured to carry either cell specific SRS or UE specific SRS. As shown in FIG. 6, SRS can be configured to be transmitted at the last data symbol (e.g., the 14th symbol). Depending on the srs-SubframeConfig and srs-Configindex, in the configured subframe, the last OFDM symbol can be used either for SRS transmission or punctured/reserved so that another user in this cell can transmit their UE specific SRS. Thus, for those subframes configured for SRS transmission, there will need to be a higher code rate for the data transmitted in those subframes, as compared to non-SRS configured subframes, which can use all 14 symbols for data transmission (i.e., and can use a lower code rate for the data). This can result from the fact that when typical UL scheduling algorithm is performed, there is no differentiation between the code rates and whether SRS is configured for a subframe.

Additionally, the time mask can be different depending on the SRS configuration, which can in turn introduce code rate difference among the UL subframes. Based on 36.101 (which is incorporated herein by reference), depending on whether it is single or dual SRS transmission and whether there is PUSCH/PUCCH transmission before/after the SRS, the transient period can be either 20 us or 40 us before and after SRS ON duration. This can also negatively affect code rates.

FIG. 7 illustrates exemplary TDD sounding reference signal subframe configurations 700 that can be used with certain embodiments. SRS subframe configuration for TDD can be found in the table of FIG. 7, as taken from LTE specification 36.211. This table defines on which subframe the SRS is transmitted and on which it is not. The values are applied for cell specific SRS. As shown in FIG. 7, for different SRS configurations, the code rate can be different. For example, in TDD, if cell specific srs-SubframeConfig is set to 2, for all UE in this cell, SRS can be transmitted every 5 ms on subframe 1 and 3. For TDD DL/UL configuration 1, subframe 1 is special subframe and the uplink pilot time slot (UpPTS) can be used for SRS. However, for subframe 3, which is the normal UL subframe, last data symbol has to be punctured or reserved for SRS transmission. Thus, the code rate on subframe 3 and 8 will be higher than that of the subframe 2 and 7, which means that 50% of the subframes (2 of 4) will be impacted.

If the same SINR-MCS mapping table is used at eNB side, the BLER for the subframes which carry the SRS can be very high, which can in turn degrade the overall UL performance. In order for UL performance to improve, this application considers a better link adaptation (LA) outer loop algorithm to address the issue where the code rate of certain subframes can be different, or higher, than others.

As mentioned previously, the same scheduling for all UL subframes may cause higher BLER and thus lesser overall system performance. Code rates can be quite different on UL depending on the SRS subframe configuration. In TD-LTE, if SRS is configured to be transmitted in normal UL subframe, the last OFDM symbol will be punctured and thus the coding rate on that subframe can be much higher than the regular UL subframe without SRS.

If the eNB LA outer loop is only run based on the overall BLER filtering, the UL scheduling will be too aggressive for subframes with SRS, which will lead to high UL BLER and lower throughput. At the same time, the eNB schedule will be too conservative to UL subframes without SRS because the average BLER obtained at the eNB includes the BLER for all subframes (i.e., averaging SRS-subframes and non-SRS-subframes), which can also lead to non-optimized link adaptation, hence lower throughput on regular UL subframes.

For example, referring back to FIG. 7, if the where cell specific srs-SubframeConfig is set to 3 and DL/UL configuration to 1, for all UEs in this cell, out of the 4 UL subframes, two subframes will have a higher coding rate. This means on 50% of UL subframes, the average BLER will be too high and on the other 50% of UL subframes, the average BLER will be too low.

In certain embodiments, BLER filtering can be applied on each UL subframe individually, which can be used to drive the link adaptation (LA) via multiple outer loops separately. In this regard, each outer loop can run the same or different BLER algorithm for each UL subframe, with each BLER filtering having the same or difference BLER target and using the same or different BLER filtering parameters. Therefore, the scheduling can all be performed on a more efficient subframe basis.

Figure 8:
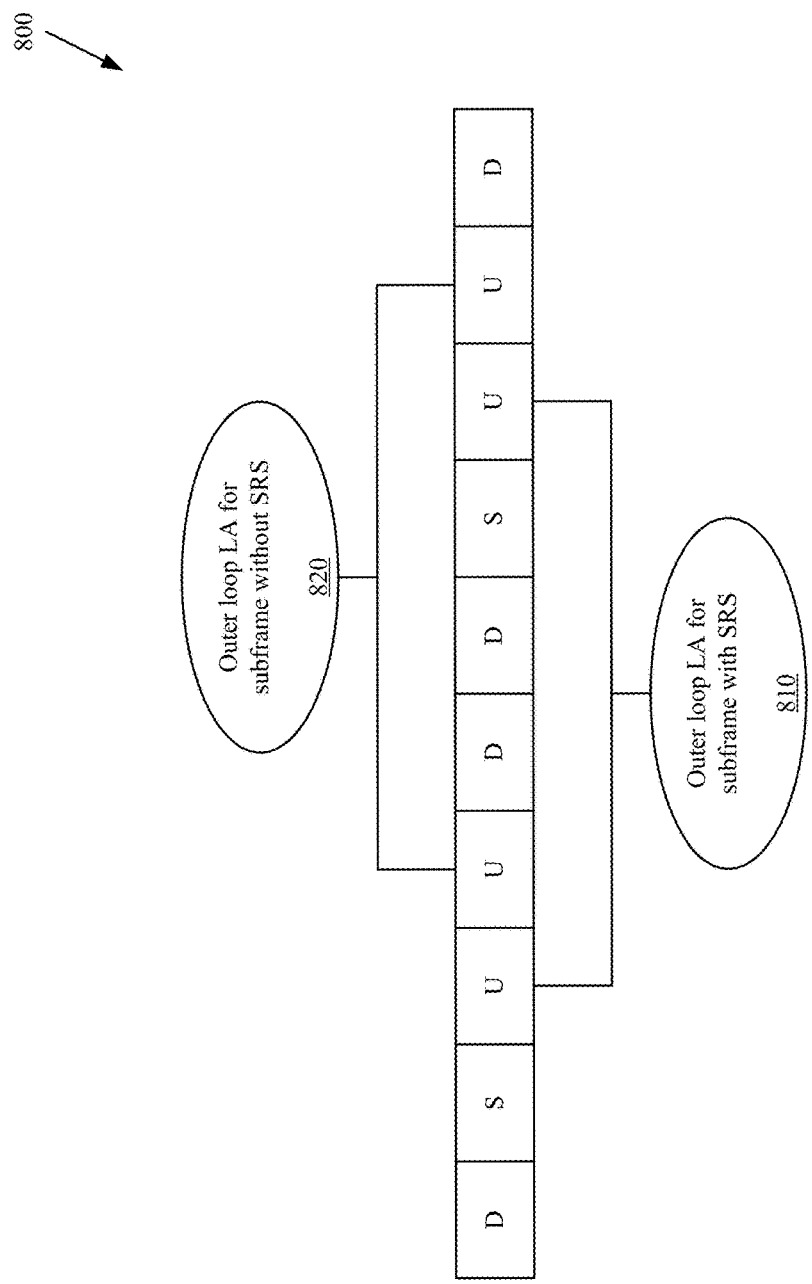
FIG. 8 illustrates exemplary adaptive UL link adaptation according to certain embodiments.

FIG. 8 illustrates exemplary adaptive UL link adaptation 800 according to certain embodiments. As shown in FIG. 8, and without compromising too much on the performance of the generalized case, above, the UL subframes can be grouped based on similar characteristics, which might reduce the complexity of performing the more generalized solution on an every-subframe basis. For example, considering the case above where 50% of the UL subframes have SRS (and 50% without), UL subframes that are SRS subframes can be grouped together for BLER filtering purposes 810 (and thus, for a first outer loop LA), and UL subframes that are non-SRS subframes can be grouped together for BLER filtering purposes 820 (and thus, for a second outer loop LA). In this way, code rates can be adaptively set for the differing types/groups of UL subframes.

In certain embodiments, the UL subframes that include SRS can have higher code rates than non-SRS UL subframes, which means that those UL subframes may be more prone to having BLER or CRC errors. So the LA outer loop for those SRS UL subframes may need to respond faster to the BLER duration. So, in this case, the BLER filtering parameters may be different for the SRS UL subframes than for the non-SRS UL subframes. However, those skilled in the art will recognize that the techniques disclosed herein can be generalized to any groups or subsets of UL subframes, or even for each individual UL subframe, for which subframe characteristic differences might be identifiable.

As previously noted, the BLER filtering for each group (or groups) can be the same or different BLER algorithm for each subframe, with each BLER filtering having the same or difference BLER target and using the same or different BLER filtering parameters. Even though this disclosure focuses on introducing the inventive concepts in terms of SRS and non-SRS subframes, those skilled in the art will recognize that these concepts can be applied to other groups of subframes, which may include any number of groups (i.e., 2 or more differing groups of subframes).

Also, in the case where the number of subframes with and without SRS is not the same, the time constant for the outer loop can be adjusted accordingly. For example, if the number of subframes with SRS is less than the ones without SRS, the time constant used can be bigger than the one for the non-SRS, to make sure the convergent time for each outer loop filter is around the same.

Figure 9:
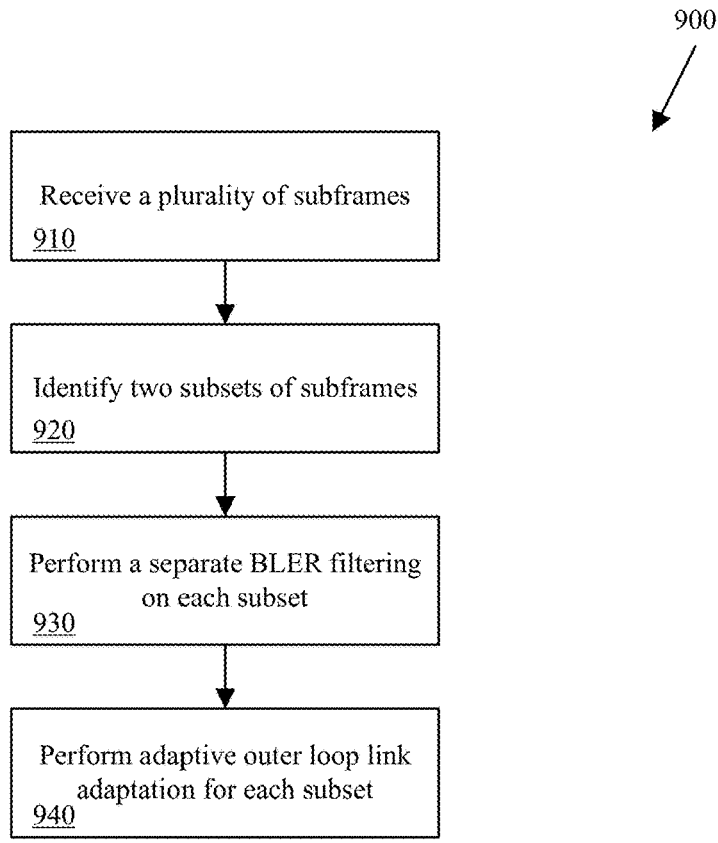
FIG. 9 illustrates an exemplary adaptive link adaptation flow according to certain embodiments.

FIG. 9 illustrates an exemplary adaptive link adaptation flow 900 according to certain embodiments. As shown in FIG. 9, a method for wireless communication can include receiving a plurality of subframes 910 and identifying at least two subsets of subframes from the plurality of received subframes 920. At least a portion of the plurality of subframes can be identified into subsets based at least on one or more subframe characteristics. At least a portion of the plurality of subframes can be identified into subsets based at least on an aggressiveness of each subframes modulation and coding scheme. Each of the at least two subsets can be identified based at least on coding rate similarities of subframes within a given subset and/or coding rate differences of subframes within other subsets. One subset of subframes can include subframes having a sounding reference signal (SRS) and another subset of subframes can include subframes not having a SRS.

Flow 900 of FIG. 9 continues, at 930, by performing BLER filtering on each subset identified at 920. The BLER filtering algorithm can be different for each subset. The BLER filtering target can be different for each subset. One or more of the BLER filtering parameters can be different for each subset. The BLER filtering can use a separate moving average for each subset. The BLER filtering can use a running average for each subset. The BLER filtering target, parameters, filtering, averaging, etc. can all or some be different or the same for each subset. Finally, at 940, Flow 900 of FIG. 9 performs adaptive outer loop link adaptation on each subset based at least on the performed BLER filtering.

Figure 10:
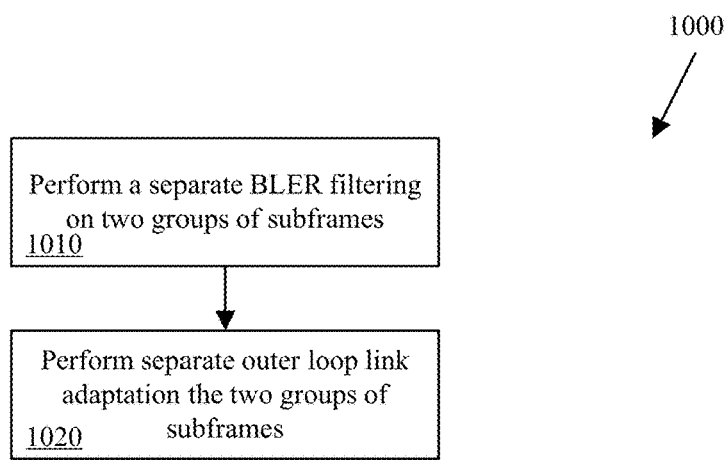
FIG. 10 illustrates an exemplary adaptive uplink link adaptation flow according to certain embodiments.

FIG. 10 illustrates an exemplary adaptive uplink link adaptation flow 1000 according to certain embodiments. As shown in FIG. 10, flow 1000 for adaptive uplink (UL) link adaptation (LA) in an LTE wireless communication can include performing separate block error rate (BLER) filtering on two groups of received subframes (1010), after which separate outer loop link adaptation can be performed on the two groups of received subframes (1020) based at least in part on the performed separate BLER filtering. The two groups of received subframes can be different from each other based at least on one or more subframe characteristics. The two groups of received subframes can be different from each other based at least on modulation and coding scheme. The two groups of received subframes can be different from each other based at least on coding rate similarities and/or differences. A first group of received subframes can include subframes having a sounding reference signal (SRS) and a second group of received subframes can include subframes not having an SRS. The BLER filtering algorithm can be different for each group. The BLER filtering target can be different for each group. One or more of the BLER filtering parameters can be different for each group. The BLER filtering can use a separate moving average for each group. The BLER filtering can use a running average for each group.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints or preferences imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in one or more software modules executed by one or more processing elements, or in a combination of the two. A software module may reside in RAM memory, flash memory, ROM memory, EPROM memory, EEPROM memory, registers, hard disk, a removable disk, a CD-ROM, or any other form or combination of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added.

What is claimed is:

1. A method for adaptive link adaptation (LA) in wireless communication comprising:
   receiving a plurality of subframes;
   identifying at least two subsets of subframes from the plurality of received subframes:
      wherein one subset of the at least two subsets of subframes includes subframes configured to be punctured for particular reference signaling and includes one or more subframes having a first coding rate; and
      wherein another subset of the at least two subsets of subframes includes only subframes not configured to be punctured by the particular reference signaling and includes one or more subframes having a second coding rate that is lower than the first coding rate;
   performing block error rate (BLER) filtering on each subset using a different BLER filtering moving average for each of the at least two subsets, based on whether subframes in the subsets are configured to be punctured for the particular reference signaling; and
   performing adaptive outer loop link adaptation on each subset, wherein the performing adaptive outer loop link adaptation includes selecting a modulation and coding scheme for subsequent communications corresponding to each subset based at least on the performed BLER filtering.

2. The method of claim 1, wherein at least a portion of the plurality of subframes are further identified into subsets based at least on an aggressiveness of a modulation and coding scheme of each subframe.

3. The method of claim 1, wherein each of the at least two subsets is identified based at least on coding rate similarities of subframes within a given subset and coding rate differences of subframes within other subsets.

4. The method of claim 1, wherein the particular reference signaling is sounding reference signal (SRS) signaling.

5. The method of claim 1, wherein a BLER filtering target is different for the at least two subsets.

6. A wireless device for adaptive link adaptation (LA) in wireless communication comprising:
   one or more processors configured to:
   receive a plurality of subframes;
   identify at least two subsets of subframes from the plurality of the subframes, wherein one subset of the at least two subsets of subframes includes subframes configured to be punctured for particular reference signaling and includes one or more subframes having a first coding rate and another subset of the at least two subsets of subframes includes only subframes not configured to be punctured by the particular reference signaling and includes one or more subframes having a second coding rate that is lower than the first coding rate;
   perform block error rate (BLER) filtering on each subset, using a different BLER filtering moving average for each of the at least two subsets, based on whether subframes in the subsets are configured to be punctured for the particular reference signaling; and
   perform adaptive outer loop link adaptation on each subset, wherein, to perform the adaptive outer loop link adaptation, the device is configured to select a modulation and coding scheme for subsequent communications corresponding to each subset based at least on the performed BLER filtering.

7. A non-transitory computer-readable medium having instructions stored thereon that are executable by a computing device to perform adaptive link adaptation (LA) operations, comprising:
   receiving a plurality of subframes;
   identifying at least two subsets of subframes from the plurality of received subframes, wherein one subset of the at least two subsets of subframes includes subframes configured to be punctured for particular reference signaling and includes one or more subframes having a first coding rate and another subset of the at least two subsets of subframes includes subframes not configured to be punctured by the particular reference signaling and includes one or more subframes having a second coding rate that is lower than the first coding rate;
   performing block error rate (BLER) filtering on each subset using a different BLER filtering moving average for each of the at least two subsets, based on whether the subsets are configured to be punctured for the particular reference signaling; and
   performing adaptive outer loop link adaptation on each subset, wherein the performing adaptive outer loop link adaptation includes selecting a modulation and coding scheme for subsequent communications corresponding to each subset based at least on the performed BLER filtering.

8. The non-transitory computer-readable medium of claim 7, wherein a BLER filtering target is different for the at least two subsets.

* * * * *